(12) United States Patent
Rooney et al.

(10) Patent No.: US 12,367,306 B2
(45) Date of Patent: Jul. 22, 2025

(54) FINE GRANULARITY READ ACCESS TO GENERATIONAL SAFEGUARDED COPY DATA

(71) Applicant: International Business Machines Corporation, Armonk, NY (US)

(72) Inventors: William J. Rooney, Hopewell Junction, NY (US); Gregory Edward McBride, Vail, AZ (US); Dale F Riedy, Poughkeepsie, NY (US); Scott B. Compton, Hyde Park, NY (US); Theresa Mary Brown, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 396 days.

(21) Appl. No.: 17/809,362

(22) Filed: Jun. 28, 2022

(65) Prior Publication Data

US 2023/0418961 A1   Dec. 28, 2023

(51) Int. Cl.
*G06F 21/62* (2013.01)
(52) U.S. Cl.
CPC ................ *G06F 21/6218* (2013.01)
(58) Field of Classification Search
CPC .................................. G06F 21/6218
See application file for complete search history.

(56) References Cited

U.S. PATENT DOCUMENTS

| 7,360,113 B2 | 4/2008 | Anderson |
| 7,668,880 B1 | 2/2010 | Carroll |
| 7,818,608 B2 | 10/2010 | DeMaio |
| 8,732,206 B2 | 5/2014 | Resch |
| 8,903,779 B1 | 12/2014 | Holenstein |
| 8,984,243 B1 | 3/2015 | Chen |
| 9,395,926 B2 | 7/2016 | Nakagawa |
| 9,588,847 B1 | 3/2017 | Natanzon |
| 10,789,132 B2 | 9/2020 | Mcbride |

(Continued)

FOREIGN PATENT DOCUMENTS

| CN | 1822004 A | 8/2006 |
| CN | 103842954 A | 6/2014 |

(Continued)

OTHER PUBLICATIONS

HP StorageWorks P9000 RAID Manager User Guide, HP Part No. T1610-96039 Published: Nov. 2011, Edition: Seventh, © 2010, 2011 Hewlett-Packard Development Company, L.P., 256 pages.

(Continued)

*Primary Examiner* — Izunna Okeke
(74) *Attorney, Agent, or Firm* — Tihon Poltavets

(57) ABSTRACT

Providing fine granularity read access to generational copies of safeguarded copy data. In some instances, a fine granularity read access to generational copies of safeguarded copy data includes the ability to use a generation ID to determine the exact generation copy that contains relevant enterprise related data that must be recovered and/or utilized. Additionally, the fine granularity read access is done in a manner that does not require a restore of the relevant enterprise related data to a recovery volume and that does not compromise other generation copies.

12 Claims, 5 Drawing Sheets

(56) References Cited

U.S. PATENT DOCUMENTS

| | | | |
|---|---|---|---|
| 2001/0052073 A1* | 12/2001 | Kern | .................. G06F 21/1077 |
| | | | 713/161 |
| 2004/0010732 A1 | 1/2004 | Oka | |
| 2004/0107321 A1 | 6/2004 | Altman et al. | |
| 2005/0223170 A1 | 10/2005 | Ushijima et al. | |
| 2006/0190505 A1 | 8/2006 | DeMaio | |
| 2006/0236056 A1 | 10/2006 | Nagata | |
| 2006/0259722 A1 | 11/2006 | Watanabe | |
| 2012/0005657 A1* | 1/2012 | Huber | ................... G06F 9/4843 |
| | | | 718/103 |
| 2016/0070490 A1 | 3/2016 | Koarashi | |
| 2019/0250849 A1 | 8/2019 | Compton et al. | |
| 2019/0324924 A1* | 10/2019 | Miller | ................. G06F 12/1483 |
| 2020/0081629 A1 | 3/2020 | Brown | |
| 2021/0208973 A1 | 7/2021 | Ngo | |
| 2023/0409441 A1 | 12/2023 | Sharma | |

FOREIGN PATENT DOCUMENTS

| | | |
|---|---|---|
| EP | 1717689 A1 | 11/2006 |
| EP | 2899634 A1 | 7/2015 |
| WO | 2020223112 A1 | 11/2020 |
| WO | 2024/001441 A1 | 1/2024 |

OTHER PUBLICATIONS

"Preventing, Detecting, and Repairing Block Corruption: Oracle Database 11g", Oracle Maximum Availability Architecture White Paper, May 2012, 17 pages.

Mell et al., "The NIST Definition of Cloud Computing", NIST National Institute of Standards and Technology U.S. Department of Commerce, Special Publication 800-145, Sep. 2011, 7 pages.

Notices of References Cited, U.S. Appl. No. 17/809,348, mailed May 22, 2024, 1 pg.

Brown et al., "Generational Access To Safeguarded Copy Source Volumes", U.S. Appl. No. 17/809,348, filed Jun. 28, 2022, 37 pages.

IBM Appendix P, "List of patents and patent applications treated as related", Filed Jun. 28, 2022, 2 pages.

International Searching Authority, "Notification of Transmittal of the International Search Report and the Written Opinion of the International Searching Authority, or the Declaration", International application No. PCT/CN2023/089039, International filing date Apr. 18, 2023, Date of mailing Jun. 26, 2023, 7 pages.

\* cited by examiner

600

| | | |
|---|---|---|
| +0 | 1 | ↑ REQUEST BLOCK |

REQUEST BLOCK

| | | | |
|---|---|---|---|
| +4 | 14 | 01 | FLAGS |
| +8 | ERROR | | INFO |
| +12 | ↑ TEXT POINTERS | | |
| +16 | ↑ REQUEST BLOCK EXT. | | |
| +20 | FLAGS2 | | |

TEXT POINTERS

| | |
|---|---|
| +24 | ↑ TEXT UNIT 1 |
| +28 | ↑ TEXT UNIT 2 |
| +32 | ↑ TEXT UNIT 3 |

TEXT UNITS

| | | | | ddname |
|---|---|---|---|---|
| +36 | 0001 | 0001 | 0008 | SYS1.PARMLIB |
| +50 | 0002 | 0001 | 000C | |
| +68 | 0004 | 0001 | 0001 | 08 |
| +76 | XXXX | 0001 | 000A | BACKUP ID |

| | | | |
|---|---|---|---|
| +XX | KEY | # | LENGTH | PARAMETER |

FIG. 6

FINE GRANULARITY READ ACCESS TO GENERATIONAL SAFEGUARDED COPY DATA

BACKGROUND

The present invention relates generally to the field of data protection, and more particularly to methods of preserving and ensuring that enterprise data that is stored in the cloud is not corrupted.

SUMMARY

According to an aspect of the present invention, there is a method, computer program product and/or computer system that performs the following operations (not necessarily in the following order): (i) receiving, by a disk storage system, a plurality of generations of safeguarded copy datasets, with the generations of safeguarded copy datasets including a plurality of copies of files stored on the disk storage system; (ii) specifying a generation ID of data in a safeguarded copy source volume; (iv) storing the generation ID in a system control block; (v) transmitting the generation ID from an I/O Supervisor (IOS) to the disk storage system; and (vi) accessing, by the disk storage system, a first generation of the safeguarded copy source volume based, at least in part, upon the generation ID that is transmitted from the IOS.

BRIEF DESCRIPTION OF THE DRAWINGS

FIG. 6 is a screenshot showing information that is helpful in understanding embodiments of the present invention.

DETAILED DESCRIPTION

Figure 1:
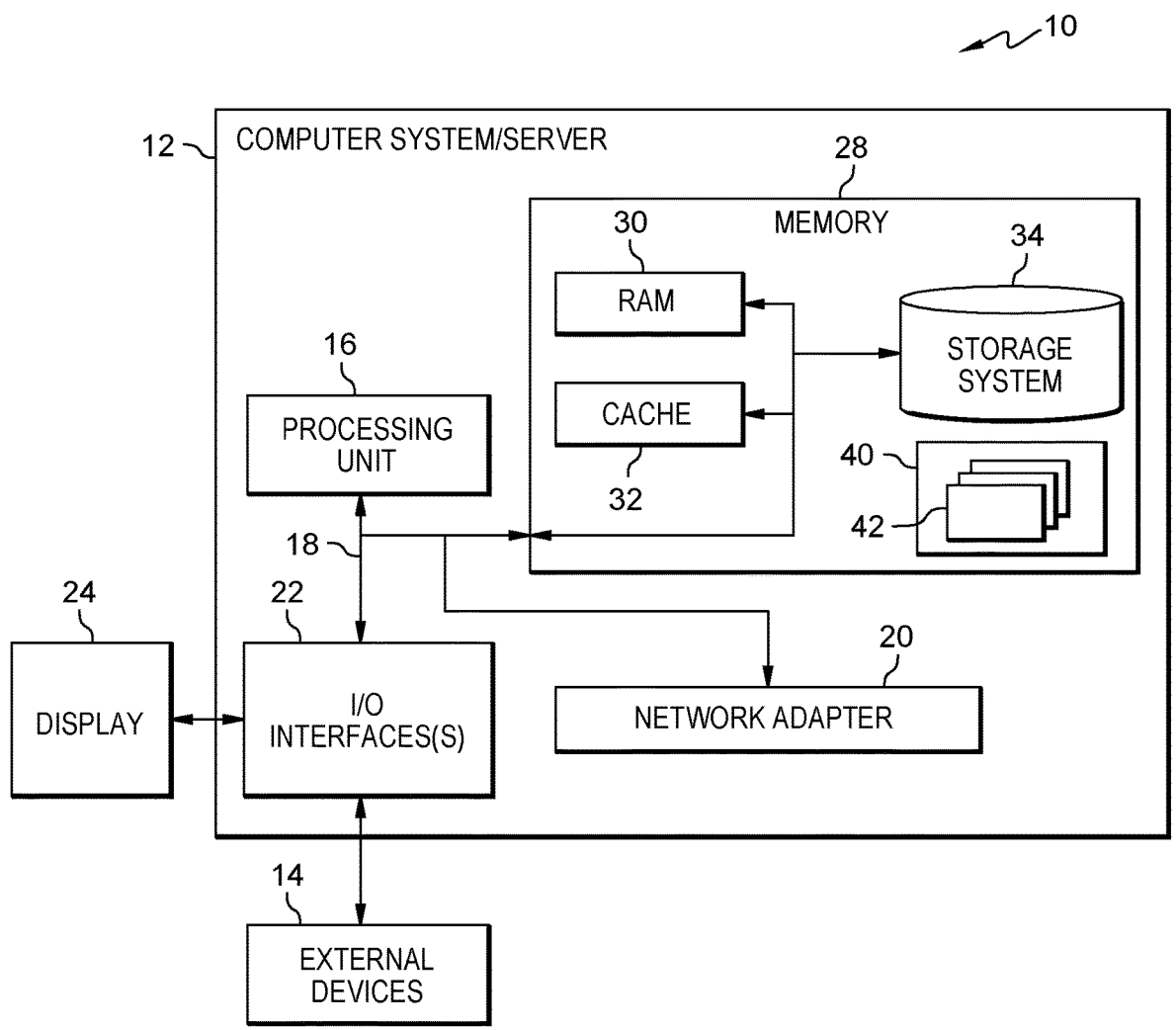
FIG. 1 depicts a cloud computing node used in a first embodiment of a system according to the present invention.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
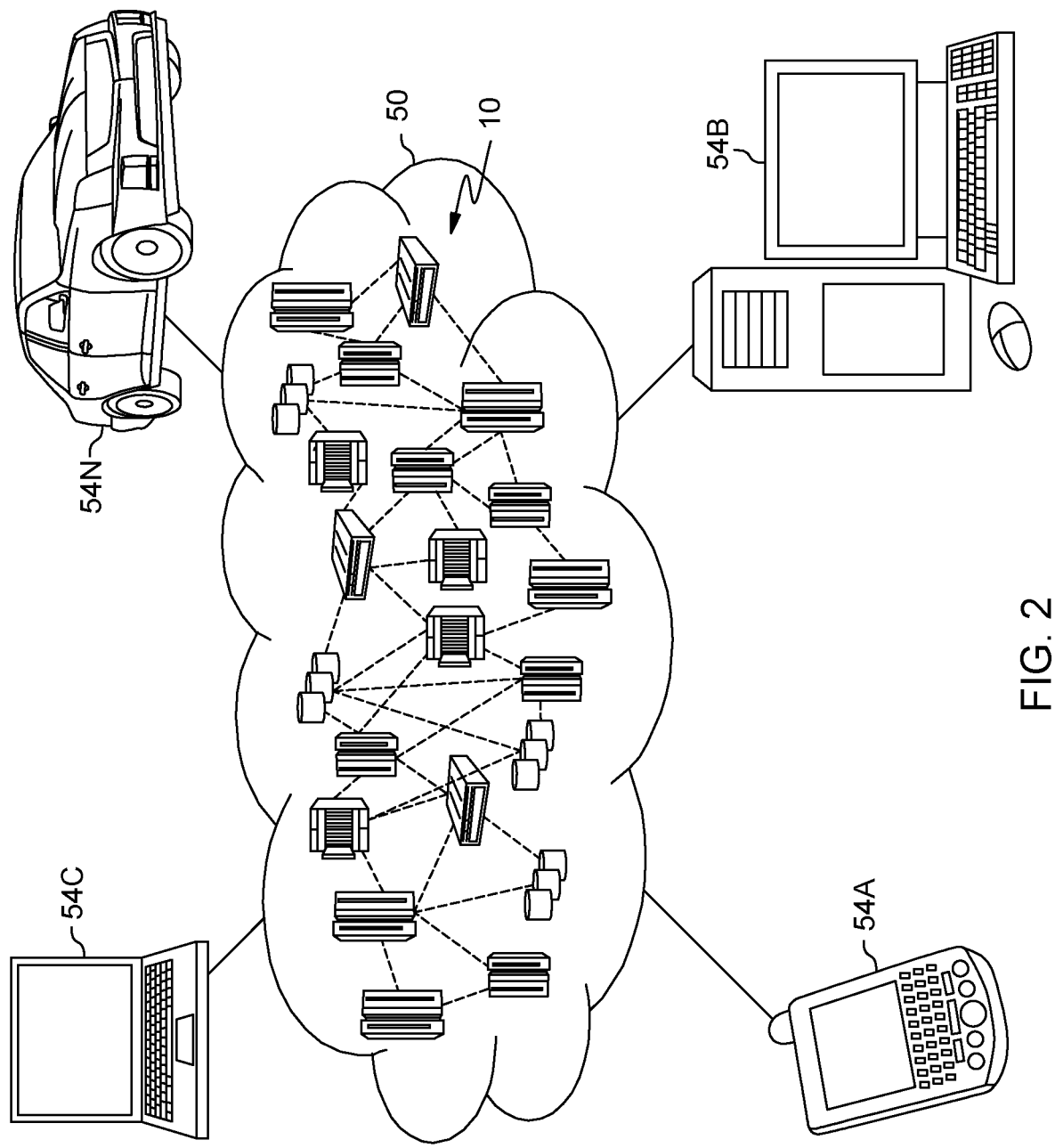
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
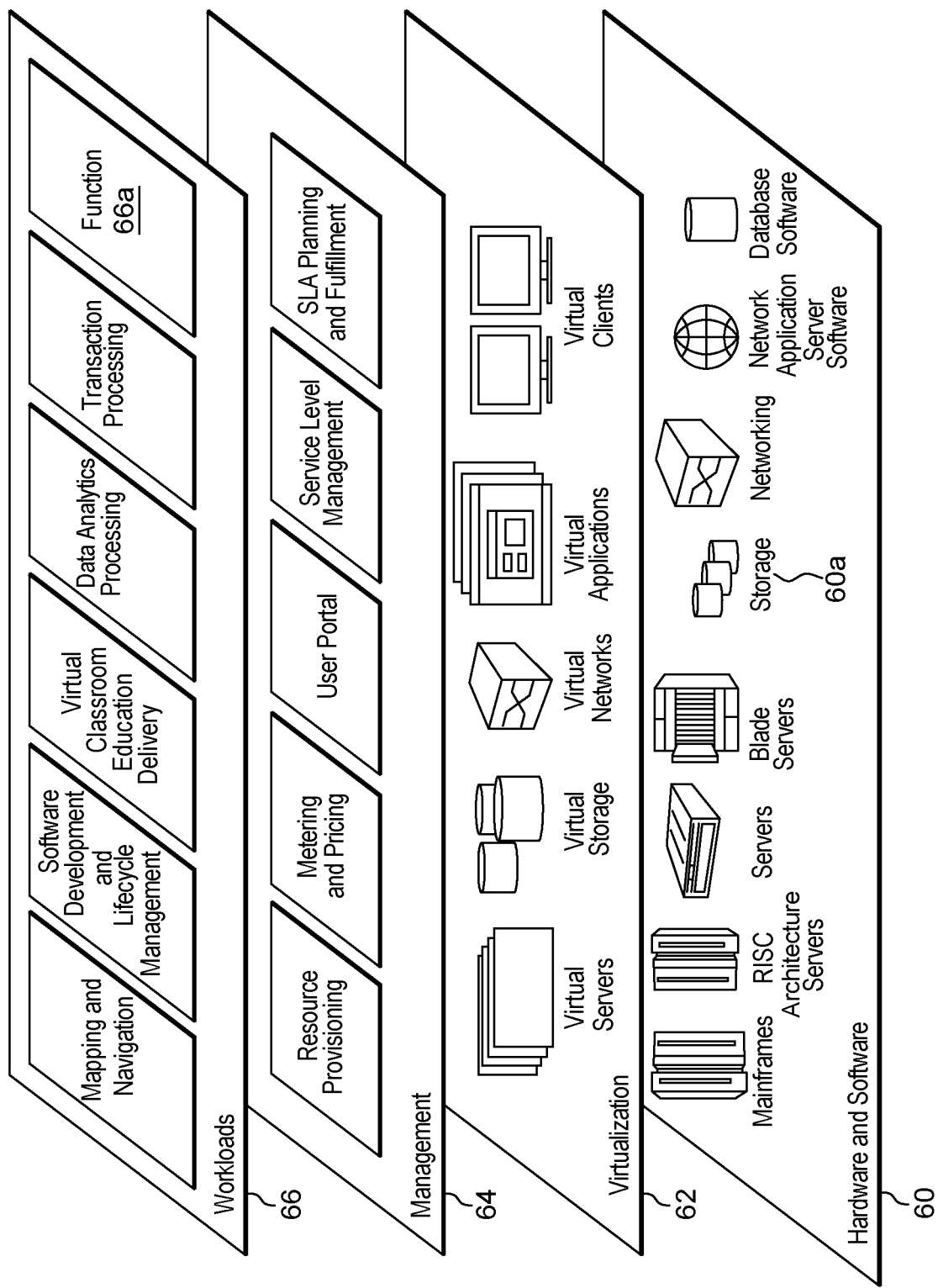
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes; RISC (Reduced Instruction Set Computer) architecture based servers; storage devices; networks and networking components. In some embodiments software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66*a*) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 4:
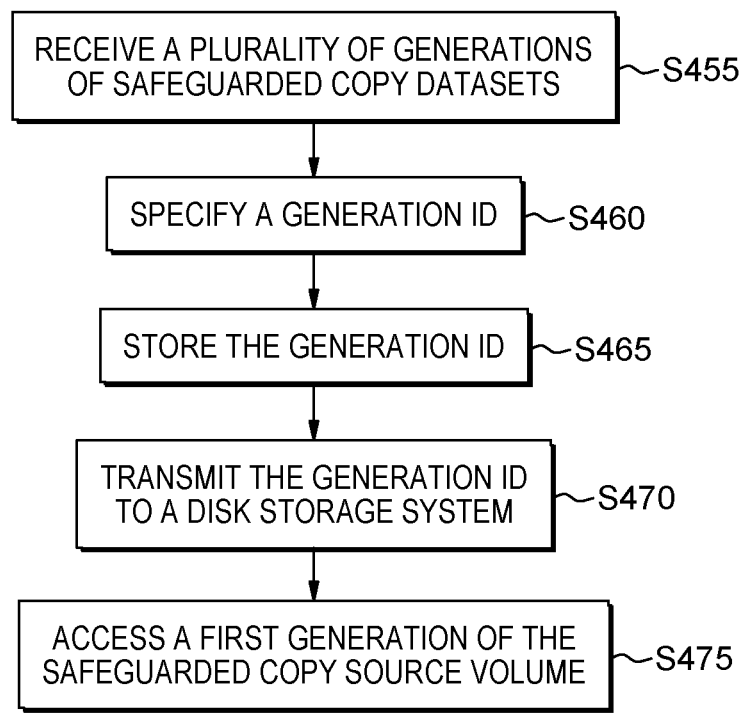
FIG. 4 is a flowchart showing a first embodiment method performed, at least in part, by the first embodiment system.
Figure 5:
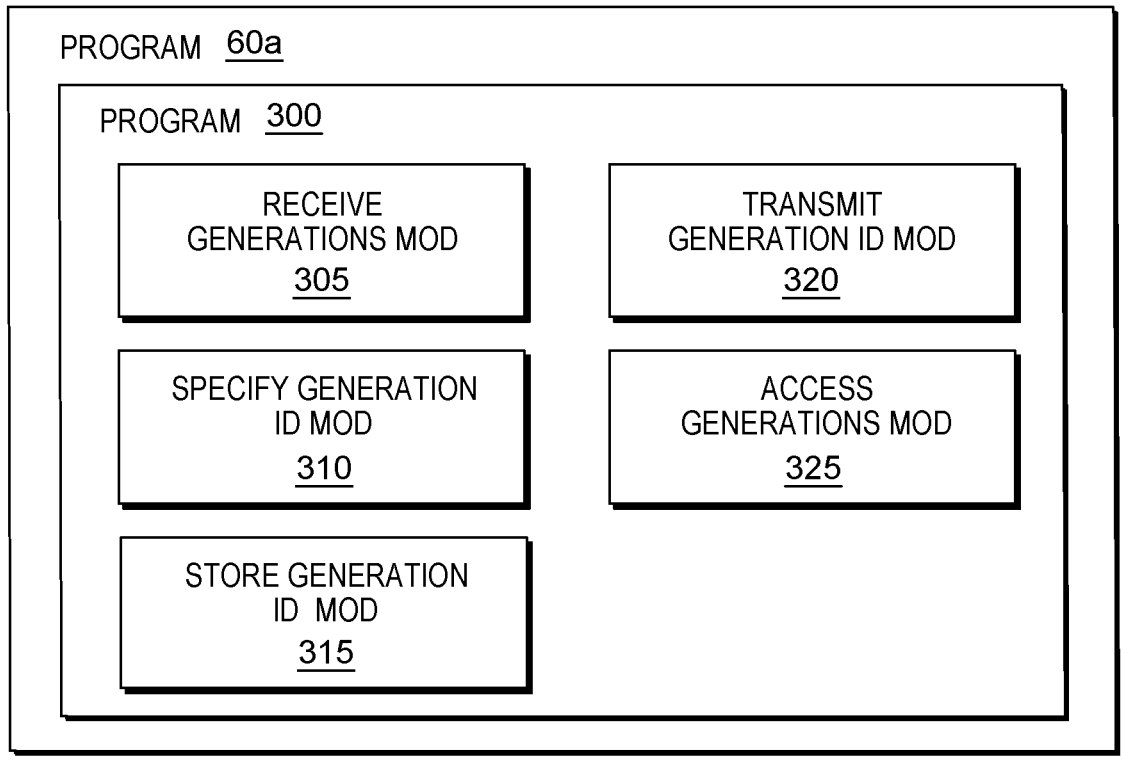
FIG. 5 is a block diagram showing a machine logic (for example, software) portion of the first embodiment system.

FIG. 4 shows flowchart 450 depicting a method according to the present invention. FIG. 5 shows program 300 for performing at least some of the method operations of flowchart 450. This method and associated software will now be discussed, over the course of the following paragraphs, with extensive reference to FIG. 4 (for the method operation blocks) and FIG. 5 (for the software blocks). One physical location where program 300 of FIG. 5 may be stored is in storage block 60*a* (see FIG. 3).

Processing begins at operation S455, where receive generations module ("mod") 305 receives a plurality of generations of safeguarded copy datasets. In some embodiments of the present invention, a first generation of the safeguarded copy datasets is a set of backup copies of original data that is copied and stored in a disk storage system at a first defined point in time. Alternatively, the first generation of the safeguarded copy datasets can be a set of backup copies or original data that is copied and stored in a virtualized storage environment at a first defined point in time. Additionally, each subsequent generation of the safeguarded copy datasets is defined and associated with the point in time in which the datasets were created and stored in the disk storage system (or in the virtualized storage environment).

Processing proceeds to operation S460, where specify generation ID mod 310 specifies a generation ID of data that is stored in a safeguarded copy source volume. In some embodiments of the present invention, specify generation ID mod 310 creates an identification syntax that is used to match a given generation of a safeguarded copy dataset to a point in time in which the generation was copied and stored to the disk storage system (or to the virtualized storage environment, as discussed in connection with operation S455, above). In some embodiments, the generation ID represents a point in time, and more specifically to a point-in-time for a set of safeguarded copies that are made for a backup purposes.

Processing proceeds to operation S465, where store generation ID mod 315 stores the generation ID (discussed in connection with operation S460, above) in a system control block. In some embodiments of the present invention, the generation ID can be accessed by specify generation ID mod 310 in the event that a given generation of the safeguarded copy dataset was modified. Alternatively, the generation ID can be accessed by specify generation ID mod 310 at pre-defined intervals of time or in any instance that a user chooses for a specific generation of the safeguarded copy dataset to be accessed.

Processing proceeds to operation S470, where transmit generation ID mod 320 transmits the generation ID from the I/O Supervisor (IOS) to the disk storage system (discussed in connection with operation S455, above). Alternatively, transmit generation ID mod 320 transmits the generation ID from the IOS to the virtualized storage environment (discussed in connection with operation S455, above). In some embodiments, normal input/output requests (I/Os) (that is, the I/Os without a specific generation ID) are simply sent to the storage controller (such as the DS8K), and the storage controller will locate the data as described in the I/O payload. In some embodiments, when a generation ID is present, the storage controller must determine if the data is in the "normal" set of disks, or if it is represented in one of the safeguarded backup copy sets associated with the generation ID.

Processing finally proceeds to operation S475, where access generations mod 325 accesses a first generation of the safeguarded copy source volume. In some embodiments of the present invention, access generations mod 325 is able to access the first generation of the safeguarded copy source volume based upon the generation ID that is transmitted from the IOS to the disk storage system (discussed in connection with operation S460, above). That is, access generations mod 325 uses the syntax created by specify generation ID mod 315 (discussed in connection with operation S460, above) to provide a user with the generation of the safeguarded copy dataset that will help the user to recover any potentially corrupted data. In some embodiments, this includes data that was originally used to create the first generation of the safeguarded copy dataset.

III. Further Comments and/or Embodiments

Some embodiments of the safeguarded copy functionality is a critical component of the product's data protection capability. With incidents of data corruption on the rise, from ransomware attacks to data corruption, both accidental and malicious, solutions are required that do not solely make copies of the data. Typically, safeguarded copy provides clients with a solution for logical data corruption protection by allowing the client to create multiple immutable generations of data consistent copies that can be used to recover data at a point prior to when the data corruption occurred.

Typically, unless the event causing the problem is known, determining the point at which data corruption was introduced can be difficult. This process involves first selecting a generation to examine and then recover that generation to a volume. This then needs to be examined and if it is not the generation prior to the corruption event, the process must be repeated until the required generation is identified.

Some implementations requires that all safeguarded copy volumes in the system must be accessed at a specified generation and may require the system to be reIPLed (i.e. booted) in order to access these older generations.

What is required is a more surgical approach to access older generations of the data without the requirement that all safeguarded copy volumes be "turned back in time" to a specific generation. The solution must allow a user to easily move between generations quickly, so that the user investigating the corruption can identify the generation in which the corruption began. It must be done without the requiring a restore of that data to a recovery volume. This must also be done without allowing the generations to be compromised in the process.

In some embodiments, safeguarded copies works by creating multiple copies of volumes in the form of backups. These backups contain only the original, unmodified, tracks that have been changed by subsequent write requests, similar to how FlashCopy works. However, unlike FlashCopy, these backups are not instantiated as traditional volumes and therefore cannot be accessed directly by a host system. This provides another layer of protection by preventing accidental or malicious modification of the backups. In order to access a generation, it must be restored to a recovery volume, which is accessible by the host. In some cases, the data corruption may be known to be limited to a single volume. In other cases, it may be necessary to recover groups of hundreds or even thousands of volumes in order to maintain data consistency. Either way, significant time may be spent recovering what will ultimately prove to be the wrong generation.

Embodiments of the present invention describe a method where the host can access each of these generations of datasets on a volume (or volumes) without the need to restore it to a recovery volume. It does this without allowing the possibility of the host modifying the backup.

Since the generation where the logical data corruption first occurred is unknown, embodiments of the present invention describe a method where the user can be running on a system which continues to make safeguarded copies at the original frequency, based on the customer's policy, while examining the contents of some of the very same volumes being accessed and updated by production work (as they appeared at each of the available generations).

Choosing the generation is done either by specifying the requested generation ID in Job Control Language (JCL) on Data Definition (DD) cards (i.e. Batch Allocation) or by specifying the generation ID on a Dynamic Allocation (SVC 99) request. In the case of Dynamic Allocation, it is expected that programs that are used or may in the future be developed, would provide the externals to specify the generation ID so that most users would not actually have to use Dynamic Allocation directly.

In some embodiments, Device Allocation, both batch and dynamic, will pass the generation ID down to Open/Close/EOV, which will in turn pass it down to the I/O Supervisor (IOS). This allows the user to examine the generations more quickly in order to identify the most recent generation prior to the data corruption event and then restore only that generation.

In some embodiments, the user specifies the generation ID of the data he or she wishes to access. The generation ID may be specified in: (i) JCL (Job Control Language) on a DD (Data Definition) card (as shown below), (ii) a Dynamic Allocation request in a text unit (as shown in screenshot diagram 600 of FIG. 6), or (iii) input to a program through any method the user chooses to accept input from (such as Graphical User Input (GUI), a full panel application such as ISPF (Interactive System Productivity Facility) panels, command parameters or text input).

In some embodiments, the JCL and the syntax of the DD card could be enhanced to allow the specification of the generation, and can be written as follows:

"//DD1 DD DSN=SYS1.PARMLIB,UNIT=3390,
    VOL=SER=SYSRES,GENID=xxxx"

In the case of an application, it may pass the generation ID down to Device Allocation on a text unit as part of a dynamic allocation request. In some embodiments of the present invention, the dynamic allocation request uses verb codes and text units in order to specify parameters. An example of a dynamic allocation text units is shown in screenshot 600 of FIG. 6.

In some embodiments, Device Allocation (batch or dynamic) will store the generation ID in a system control block that can be accessed by Open, which will in turn make this information available to the I/O Supervisor (IOS) via a specified and customized interface.

In some embodiments, the IOS will pass the generation ID to the safeguarded copy program in the channel program using a SSCH (Start Subchannel) instruction. In some embodiments, IOS may utilize the I/O prefix command to pass the generation ID to the safeguarded copy program. Alternatively, the IOS could pass the generation ID in the Define Extent, a new "set domain command," or any other appropriate means.

By specifying the generation ID on parameters to "Device Allocation" or "Open," the scope of the I/O requests is limited to just that dataset that is opened.

This provides several possibilities: (i) two or more programs or users may be looking at the same dataset at the same time, but are looking at different generations; (ii) a program or user may access two or more different generations of the same dataset at the same time (for example, "dataset compare"); and (iii) a program or user may be accessing older generations of datasets while the system is running normally and updating the current version of the dataset.

It is important to note that not all of these operations may necessarily be required in order to implement embodiments of the present invention. For example, the generation ID may not necessarily be specified on the Device Allocation request (either batch or dynamic) and instead may be specified on the Open request. In some embodiments, additional controls can be provided to specify the generation ID for an entire job or step within a job.

Embodiments of the present invention provide a method for accessing respective generations of safeguarded copy datasets by a disk storage system without restoring the safeguarded copy datasets to a recovery volume. This method includes the following operations (and not necessarily in the following order): (i) specifying a generation ID of data in a safeguarded copy source volume; (ii) storing the generation ID in a system control block; (iii) transmitting the generation ID from an I/O Supervisor (IOS) to the disk storage system; and (iv) accessing, by the disk storage system, a generation of the safeguarded copy source volume based on the generation ID transmitted from the IOS, wherein writes are inhibited in response to using the generation ID to access the generation of the safeguarded copy source volumes.

In some embodiments, the generation ID that is specified is selected from a group including Job Control Language (JCL) that uses a data definition (DD) statement and/or a dynamic allocation request. Additionally, in some embodiments, transmitting the generation ID from the IOS to the disk storage system utilizes a Start Subchannel (SSCH) instruction.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
   receiving, by a disk storage system, a plurality of generations of safeguarded copy datasets, with the plurality of generations of safeguarded copy datasets including a plurality of copies of files stored on the disk storage system;

specifying a generation ID of data in a safeguarded copy source volume through a data definition (DD) statement using Job Control Language (JCL) protocol;

storing the generation ID in a system control block, wherein the generation ID is available to an I/O Supervisor via a specified and customized interface;

transmitting the generation ID from the I/O Supervisor to the disk storage system; and accessing, by the disk storage system, a first generation of the safeguarded copy source volume based, at least in part, upon the generation ID that is transmitted from the I/O Supervisor, wherein write operations to the disk storage system are inhibited in response to using the generation ID to access the first generation of the safeguarded copy source volume.

2. The method of claim 1 wherein the generation ID is specified through a dynamic allocation request.

3. The method of claim 1 wherein the generation ID is transmitted from the I/O Supervisor to the disk storage system using a Start Subchannel (SSCH) instruction.

4. The method of claim 1 wherein the generation ID and a set of input/output (I/O) requests is transmitted to a storage controller.

5. A computer program product comprising:
a machine readable storage device; and
computer code included in the machine readable storage device, with the computer code including instructions and data for causing a processor set to perform operations including:

receiving, by a disk storage system, a plurality of generations of safeguarded copy datasets, with the plurality of generations of safeguarded copy datasets including a plurality of copies of files stored on the disk storage system;

specifying a generation ID of data in a safeguarded copy source volume through a data definition (DD) statement using Job Control Language (JCL) protocol;

storing the generation ID in a system control block, wherein the generation ID is available to an I/O Supervisor via a specified and customized interface;

transmitting the generation ID from the I/O Supervisor to the disk storage system; and accessing, by the disk storage system, a first generation of the safeguarded copy source volume based, at least in part, upon the generation ID that is transmitted from the I/O Supervisor, wherein write operations to the disk storage system are inhibited in response to using the generation ID to access the first generation of the safeguarded copy source volume.

6. The computer program product of claim 5 wherein the generation ID is specified through a dynamic allocation request.

7. The computer program product of claim 5 wherein the generation ID is transmitted from the I/O Supervisor to the disk storage system using a Start Subchannel (SSCH) instruction.

8. The computer program product of claim 5 wherein the generation ID and a set of input/output (I/O) requests is transmitted to a storage controller.

9. A computer system comprising:
a processor set;
a machine readable storage device; and
computer code stored on the machine readable storage device, with the computer code including instructions and data for causing the processor set to perform operations including:

receiving, by a disk storage system, a plurality of generations of safeguarded copy datasets, with the plurality of generations of safeguarded copy datasets including a plurality of copies of files stored on the disk storage system;

specifying a generation ID of data in a safeguarded copy source volume through a data definition (DD) statement using Job Control Language (JCL) protocol;

storing the generation ID in a system control block, wherein the generation ID is available to an I/O Supervisor via a specified and customized interface;

transmitting the generation ID from the I/O Supervisor to the disk storage system; and accessing, by the disk storage system, a first generation of the safeguarded copy source volume based, at least in part, upon the generation ID that is transmitted from the I/O Supervisor, wherein write operations to the disk storage system are inhibited in response to using the generation ID to access the first generation of the safeguarded copy source volume.

10. The computer system of claim 9 wherein the generation ID is specified through a dynamic allocation request.

11. The computer system of claim 9 wherein the generation ID is transmitted from the I/O Supervisor to the disk storage system using a Start Subchannel (SSCH) instruction.

12. The computer system of claim 9 wherein the generation ID and a set of input/output (I/O) requests is transmitted to a storage controller.

* * * * *